United States Patent [19]

Dawson

[11] Patent Number: 5,067,566

[45] Date of Patent: Nov. 26, 1991

[54] LOW TEMPERATURE DEGRADATION OF GALACTOMANNANS

[75] Inventor: Jeffrey C. Dawson, Spring, Tex.

[73] Assignee: BJ Services Company, Houston, Tex.

[21] Appl. No.: 640,957

[22] Filed: Jan. 14, 1991

[51] Int. Cl.5 ............................................. E21B 43/26
[52] U.S. Cl. ................................... 166/308; 252/8.551
[58] Field of Search ............... 166/308, 281, 283, 300, 166/294; 251/8.551

[56] References Cited

U.S. PATENT DOCUMENTS

| | | | |
|---|---|---|---|
| 3,163,219 | 12/1964 | Wyant et al. | 166/283 |
| 3,766,984 | 10/1973 | Nimerick | 166/294 |
| 3,922,173 | 11/1975 | Misak | 106/194 |
| 3,960,736 | 6/1976 | Free et al. | 166/308 X |
| 3,974,077 | 8/1976 | Free | 252/8.551 |
| 4,202,795 | 5/1980 | Burnham et al. | 166/308 X |
| 4,250,044 | 2/1981 | Hinkel | 166/308 X |
| 4,506,734 | 3/1985 | Nolte | 166/308 |
| 4,683,068 | 7/1987 | Kucera | 166/308 X |
| 4,750,562 | 6/1988 | Jennings, Jr. | 166/308 |

Primary Examiner—Stephen J. Novosad
Attorney, Agent, or Firm—Charles D. Gunter, Jr.

[57] ABSTRACT

A method is shown for fracturing a subterranean formation in which a hydratable polymer, crosslinking agent and breaker are combined to form a gelled fracturing fluid. The pH of the fracturing fluid is initially raised above and 9.0 to deactivate the breaker. A pH regulating substance is added to the fracturing fluid which slowly hydrolyzes to produce an acid, thereby dropping the breaker to produce a controlled break of the polymer gel.

9 Claims, No Drawings

LOW TEMPERATURE DEGRADATION OF GALACTOMANNANS

BACKGROUND OF THE INVENTION

1. Field of the Invention

The present invention relates generally to gelled fracturing fluids of the type used in well bore operations and particularly to a method for producing a gradual reduction in the viscosity of a gelled fracturing fluid through the use of chemical agents incorporated in the gelled fluid.

2. Description of the Prior Art

During hydraulic fracturing, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such a suitable polysaccharide. The gelled fluid can be accompanied by a propping agent which results in placement of the propping agent within the fracture thus produced. The proppant remains in the produced fracture to prevent the complete closure of the fracture and to form a conductive channel extending from the well bore into the formation being treated once the fracturing fluid is recovered.

The recovery of the fracturing fluid is accomplished by reducing the viscosity of the fluid to a low value such that it flows naturally from the formation under the influence of formation fluids. This viscosity reduction or conversion is referred to as "breaking" and can be accomplished by incorporating chemical agents, referred to as breakers, into the initial gel.

In addition to the importance of providing a breaking mechanism for the gelled fluid to facilitate recovery of the fluid and resume production, the timing of the break is also of great importance. Gels which break prematurely can cause suspended proppant material to settle out of the gel before being introduced a sufficient distance into the produced fracture. Premature breaking can also result in a premature reduction in the fluid viscosity resulting in a less than desirable fracture width in the fracture being created.

On the other hand, gelled fluids which break too slowly can cause slow recovery of the fracturing fluid from the produced fracture with attendant delay in resuming the production of formation fluids. Additional problems can result, such as the tendency of proppant to become dislodged from the fracture, resulting in at least partial closing and decreased efficiency of the fracturing operation.

For purposes of the present application, premature breaking will be understood to mean that the gel viscosity becomes diminished to an undesirable extent before all of the fluid is introduced into the formation to be fractured. Thus, to be satisfactory, gel viscosity should remain in the range from about 50 to 75% of the initial viscosity of the gel for at least two hours of exposure to the expected operating temperature.

Optimally, the fracturing gel will begin to break when the pumping operations are concluded. For practical purposes, the gel should be completely broken within about 24 hours after completion of the fracturing treatment. A completely broken gel will be taken to mean one that can be flushed from the formation by the flowing formation fluids or that can be recovered by a swabbing operation. In the 14 laboratory setting, a completely broken, non-crosslinked gel is one whose viscosity is about 10 centipoises or less as measured on a Model 35 Fann viscometer at 300 rpm or less than 100 centipoises by Brookfield viscometer.

By way of comparison, certain gels, such as those based upon guar polymers, undergo a natural break without the intervention of chemical additives. The breaking time for such gelled fluids is excessive, being somewhere in the range from greater than 24 hours to about two weeks at an exposure temperature exceeding 80° F. Accordingly, to decrease the break time of gels used in fracturing, chemical agents are incorporated into the gel and become a part of the gel itself. Typically, these agents are either oxidants or enzymes which operate to degrade the polymeric gel structure.

However, obtaining controlled breaks using oxidants or enzymes, especially at lower temperatures, has proved to be difficult. At temperatures ranging from ambient to 130° F, the common oxidants are ineffective, requiring either higher temperatures to cause homolytic cleavage of the peroxide linkage or a coreactant to initiate cleavage. The enzymes, although effective at these lower temperatures, are sensitive to pH. Enzymatic activity rapidly declines after exceeding pH 8.0 and denatures above pH 9.0. In the case of borate crosslinked guar gels, the gels are also pH dependant requiring pH in excess of 8.0 to initiate gellation. As the pH is increased, the resulting gel becomes stronger, often requiring less borate crosslinker. Normally, these gels are buffered to maintain a pH range of 8.2 to 8.5 to ensure both gellation and enzymatic degradation. This technique requires high concentrations of both borate and enzyme. Unfortunately, while ensuring good breaks, the initial gel stability is also weakened. The determination of the optimum enzyme concentration is a compromise between initial gel stability and an adequate break.

The present invention has as its object to provide a break mechanism for a gelled fracturing fluid which yields high initial viscosity with little change during pumping but which produces a rapid break in the gel after pumping is completed to allow immediate recovery of the fluid from the formation.

Another object of the invention is to provide a gel system for a well fracturing operation which will completely break within about 24 hours but which will maintain a satisfactory viscosity at operating temperatures for a time sufficient to complete the fracturing treatment.

SUMMARY OF THE INVENTION

In the method of the invention, a gellable fracturing fluid is formulated by blending together an aqueous fluid, a hydratable polymer, a suitable crosslinking agent for crosslinking the hydratable polymer to form a polymer gel and an enzyme breaker which is effective to degrade the polymer gel at temperatures below about 140-150 F within a time period less than about 24 hours. In order to provide a controlled break, the pH of the fracturing fluid is initially raised above about 9.0, whereby the enzyme breaker is inert. A pH regulating substance is also incorporated in the fracturing fluid which slowly hydrolyzes to produce a Bronsted acid, thereby dropping the pH of the fracturing fluid. As the pH of the fracturing fluid drops, the enzyme breaker is activated to attack the polymer and produce a controlled break of the polymer gel.

Additional objects, features and advantages will be apparent in the written description which follows.

DETAILED DESCRIPTION OF THE INVENTION

In order to practice the method of the invention, an aqueous fracturing fluid is first prepared by blending a hydratable polymer into an aqueous fluid. The aqueous fluid could be, e.g., water, brine, or water-alcohol mixtures. Any suitable mixing apparatus may be used for this procedure. In the case of batch mixing, the hydratable polymer and aqueous fluid are blended for a period of time which is sufficient to form a hydrated sol. The hydratable polymer useful in the present invention can be any of the hydratable polysaccharides familiar to those in the well service industry which is capable of gelling in the presence of a crosslinking agent to form a gelled based fluid. For instance, suitable hydratable polysaccharides are the galactomannan gums, glucomannan gums, guars, derived guars and cellulose derivatives. Specific examples are guar gum, guar gum derivatives, locust bean gum, caraya gum, carboxymethyl cellulose, carboxymethyl hydroxyethyl cellulose, and hydroxyethyl cellulose. The preferred gelling agents are guar gum, hydroxypropyl guar, carboxymethyl hydroxypropyl guar, and carboxymethyl hydroxyethyl cellulose. A suitable synthetic polymer is polyvinyl alcohol. The most preferred hydratable polymers for the present invention are guar gum and hydroxypropyl guar.

The hydratable polymer is added to the aqueous fluid in concentrations ranging from about 0.10% to 5.0% by weight of the aqueous fluid. The most preferred range for the present invention is about 0.20% to 0.80% by weight.

In addition to the hydratable polymer, the fracturing fluids of the invention include a crosslinking agent, an enzyme breaker and a pH regulating companion material for the enzyme breaker. The crosslinking agent can be any of the conventionally used crosslinking agents which are known to those skilled in the art. For instance, in recent years, gellation of the hydratable polymer has been achieved by crosslinking these polymers with metal ions including aluminum, antimony, zirconium and titanium containing compounds including the so-called organotitanates. See, for instance, U.S. Pat. No. 4,514,309, issued Apr. 30, 1985, and assigned to the assignee of the present invention. Recently, there has been renewed interest in guar gels which are crosslinked by the addition of borate ion donating materials. Recent research indicates that these gels clean up faster and yield higher sand pack permeability than guar gels crosslinked with other crosslinking agents. As a result, the borate crosslinking agents are preferred.

In the case of the borate crosslinkers, the crosslinking agent is any material which supplies borate ions in solution. Thus the crosslinking agent can be any convenient source of borate ions, for instance the alkali metal and the alkaline earth metal borates and boric acid. A preferred crosslinking additive is sodium borate decahydrate. This crosslinking additive is preferably present in the range from about 0.001% to in excess of 0.5% by weight of the aqueous fluid. Preferably, the concentration of crosslinking agent is in the range from about 0.005% to about 0.25% by weight of the aqueous fluid.

Breakers commonly used for this application include alpha and beta amylases, amyloglucosidase, aligoglucosidase, invertase, maltase, cellulase, hemi-cellulase, and the like. These breaker chemicals can be in the form of either a liquid or a powder which is activated by contact with the aqueous fluid. At temperatures below about 140.F, the enzyme breakers are preferred.

A conventional enzyme type breaker is preferably added either to the aqueous liquid prior to gelling, simultaneously with the gelling agent during formation of the gel, to the base gel or to the crosslinked gel. Suitable enzyme breakers include, for example, the cellulases, hemi-cellulases, pectinases and mixtures thereof which are familiar to those in the well service industry. These breakers were originally developed for use in the fruit juice industry in order to reduce the volume of pulp in the juice. These enzymes are specific to degrade the particular polymeric linkage found on the polysaccharide polymer backbone of the crosslinked gel, for instance, the 1, 4 linkage between mannose in galactomannans. In case of the enzyme breaker, it is preferably present in the range from about 0.005% to about 0.85% by weight based on the weight of aqueous fracturing fluid.

The fracturing fluids of the invention also have a pH regulating substance incorporated therein as a companion material to the enzyme breaker. The pH regulating substance is any substance which is initially inert but slowly hydrolyzes in the gelled fracturing fluid to produce a Bronsted acid, thereby gradually lowering the pH of the gelled fluid and activating the enzyme breaker. The preferred pH regulating substances include organic anhydrides, acyl halides, sulfonyl halides, benzylic halides and low molecular weight esters which slowly hydrolyze to produce Bronsted acids. By "low molecular weight" ester is meant that the ester should be soluble in the fracturing fluid in order to accomplish its intended purpose of hydrolyzing with time to produce an acid. Generally, the higher the molecular weight, the less soluble the ester. As a result, lower molecular weight esters are preferred for ease of use. Preferably, the pH regulating substance is a low molecular weight ester selected from the group consisting of ethyl acetate, 2-ethoxyethylacetate, ethylacetoacetate, triethylcitrate, methylbenzoate and dimethylphthalate. Typical molecular weights for the 2-ethoxyethylacetate, ethylacetoacetate and triethylcitrate used in the examples which follow are 132, 130 and 276 respectively. Preferably, the pH regulating substance is present in the range from about 0.01% to about 0.85% by weight of the aqueous fluid.

Propping agents are typically added to the base fluid prior to the addition of the crosslinking agent. Propping agents include, for instance, quartz sand grains, glass and ceramic beads, walnut shell fragments, aluminum pellets, nylon pellets, and the like. The propping agents are normally used in concentrations between about 1 to 8 pounds per gallon of fracturing fluid composition, but higher or lower concentrations can be used as required. The base fluid can also contain other conventional additives common to the well service industry such as surfactants, corrosion inhibitors, and the like.

In the method of the invention, the pH of the gelled fluid is first raised above about 8 to 10.5 through the use of a suitable buffer, whereby the enzyme breaker is inert. Preferably, the gel pH is increased above about 9.0 which enhances gel strength and denatures the enzyme. The optimum pH range is from about 9.0 to 10.5.

Any conventional buffer can be used to adjust the pH, for instance aqueous potassium carbonate. As the fluid is being pumped, the pH regulating substance slowly hydrolizes to produce a Bronsted acid. As the pH of the fluid declines below 9.0, the enzyme breaker reactivates and begins to degrade the polymer used in the gel. Additionally, where a borate crosslinker is utilized, the borate crosslinker deactivates with declining pH further degrading the gel.

In a typical fracturing operation, the fracturing fluid of the invention is pumped at a rate sufficient to fracture the formation and to place propping agents into the fracture. A typical fracturing treatment would be conducted by hydrating a 0.24 to 0.72% galactomannan based polymer, such as a guar, in a 2% (weight/vol) KCl solution at a pH ranging from about 5.0 to 8.5. During the actual pumping, as described, the pH is raised by the addition of a buffer to above 9.0, followed by the addition of the crosslinking agent, breaker, pH regulating substance and proppant.

The following examples are intended to be illustrative of the invention:

EXAMPLE #1

A sol containing 2%(wt) potassium chloride and 0.48%(wt) hydroxypropyl guar was hydrated in 2.5 l of tap water for several hours. The sol was divided into ten 250 ml aliquots. Each was treated with 0.20%(vol) 30% aqueous potassium carbonate, a quantity and ester type, as shown in Table 1, 0.024%(wt) of a hemicellulase enzyme, and 0.15%(vol) of Tyzor 101, a commonly available Dupont de Nemours, Inc. titanate crosslinking solution. The ester quantities are given as volume percentages, based on the total volume of sol. The gelation process required several minutes to begin. The test temperature was 72° F. and the viscosity was measured by RVF Brookfield viscometer while recording pH. The viscosity and pH over time are shown in Table 1. Run 10 (blank) lacked both the high pH inducing 0.2%(vol) potassium carbonate solution and the ester.

EXAMPLE #2

A sol containing 2%(wt) potassium chloride and 0.48%(wt) hydroxypropyl guar was hydrated for several hours in 2.5 liters of tap water. The sol was then divided into ten 250 ml aliquots and treated with 0.117%(wt) potassium carbonate, 0.024%(wt) of a hemicellulase enzyme, a quantity and type of ester, as shown in Table 2, and 0.15%(vol) of a sodium borate solution (5.2%(wt) as $B_2O_3$ active). The ester quantities are given as volume percentages, based on the total volume of sol. Gelation resulted immediately. The test temperature was 72° F. and the viscosity was measured by an RVF Brookfield viscometer while also recording pH. The data are shown below in Table 2. Run 10 (blank) lacked addition of any ester.

EXAMPLE #3

A sol prepared as in Example 1 and 2 was divided ten 250 ml aliquots. Each aliquot was treated with 0.2%(vol) of 30%(wt) potassium carbonate, 0.024%(wt) of a hemicellulase enzyme, a quantity and type of ester, as shown in Table 3, and 0.08%(vol) of a zirconium lactate solution (7.5%(wt) as $ZrO_2$). The ester quantities are given as volume percentages, based on the total volume of sol. The test temperature was 72° F. and the viscosity was measured by RVF Brookfield viscometer while recording pH. Run 10 (blank) lacked addition of both the potassium carbonate solution and ester.

TABLE 1

| RUN | 2-ethoxy ethyl acetate | ethyl aceto acetate | triethyl citrate | TEMP °F. | 0 hr/ pH | 1 hr/ pH | 2 hr/ pH | 4 hr/ pH | 6 hr/ pH | 24 hr/ pH |
|---|---|---|---|---|---|---|---|---|---|---|
| 1 | 0.4 | | | 72 | 13,000 / 10.33 | 17,500 / 9.99 | 16,200 / 9.80 | 13,600 / 9.52 | 12,200 / 9.44 | 70 / 8.09 |
| 2 | 0.6 | | | 72 | 15,000 / 10.30 | 16,500 / 9.90 | 14,000 / 9.66 | 9,400 / 9.36 | 7,400 / 9.18 | 50 / 7.86 |
| 3 | 0.8 | | | 72 | 16,500 / 10.30 | 16,000 / 9.79 | 12,400 / 9.53 | 6,800 / 9.17 | 3,600 / 8.99 | 40 / 7.74 |
| 4 | | 0.4 | | 72 | 10,000 / 9.90 | 10,500 / 9.63 | 8,100 / 9.40 | 4,500 / 9.10 | 1,500 / 8.95 | 40 / 7.74 |
| 5 | | 0.6 | | 72 | 7,500 / 9.78 | 8,500 / 9.48 | 4,000 / 9.22 | 1,700 / 8.88 | 580 / 8.70 | 30 / 7.57 |
| 6 | | 0.8 | | 72 | 4,500 / 9.68 | 5,000 / 9.35 | 1,800 / 9.08 | 420 / 8.71 | 200 / 8.51 | 30 / 7.47 |
| 7 | | | 0.4 | 72 | 13,000 / 10.09 | 7,000 / 9.32 | 1,700 / 8.90 | 200 / 8.43 | 120 / 8.23 | 30 / 7.46 |
| 8 | | | 0.6 | 72 | 10,500 / 10.03 | 3,500 / 9.05 | 400 / 8.61 | 120 / 8.14 | 80 / 7.96 | 30 / 7.35 |
| 9 | | | 0.8 | 72 | 9,000 / 9.95 | 1,500 / 8.83 | 200 / 8.33 | 80 / 7.90 | 60 / 7.81 | 30 / 7.25 |
| 10 | (Blank) | | | 72 | 120 / 7.98 | 60 / 7.48 | 40 / 7.45 | 40 / 7.40 | 30 / 7.38 | 20 / 7.21 |

TABLE 2

| RUN | 2-ethoxy ethyl acetate | ethyl aceto acetate | triethyl citrate | TEMP °F. | 0 hr/ pH | 1 hr/ pH | 2 hr/ pH | 4 hr/ pH | 6 hr/ pH | 24 hr/ pH |
|---|---|---|---|---|---|---|---|---|---|---|
| 1 | 0.4 | | | 72 | 30,000 / 10.15 | 20,000 / 9.90 | 28,000 / 9.76 | 21,000 / 9.62 | 2,000 / 9.43 | 50 / 8.67 |
| 2 | 0.6 | | | 72 | 22,000 / 10.16 | 14,000 / 9.84 | 18,000 / 9.71 | 10,000 / 9.49 | 700 / 9.28 | 42 / 8.44 |
| 3 | 0.8 | | | 72 | 28,000 / 10.15 | 26,000 / 9.78 | 20,000 / 9.63 | 7,500 / 9.39 | 500 / 9.14 | 38 / 8.23 |
| 4 | | 0.4 | | 72 | 19,000 | 20,000 | 22,000 | 900 | 190 | 28 |

TABLE 2-continued

| RUN | 2-ethoxy ethyl acetate | ethyl aceto acetate | triethyl citrate | TEMP °F. | Viscosity and pH after time indicated. | | | | | |
|---|---|---|---|---|---|---|---|---|---|---|
| | | | | | 0 hr/pH | 1 hr/pH | 2 hr/pH | 4 hr/pH | 6 hr/pH | 24 hr/pH |
| 5 | | 0.6 | | 72 | 14,000 9.83 | 22,000 9.61 | 12,000 9.51 | 280 9.28 | 120 9.05 | 30 8.09 |
| | | | | | 9.73 | 9.49 | 9.33 | 9.08 | 8.80 | 7.82 |
| 6 | | 0.8 | | 72 | 12,000 | 18,000 | 10,000 | 170 | 90 | 26 |
| | | | | | 9.65 | 9.37 | 9.21 | 8.92 | 8.60 | 7.64 |
| 7 | | | 0.4 | 72 | 24,000 | 9,000 | 4,000 | 180 | 100 | 28 |
| | | | | | 9.97 | 9.46 | 9.25 | 8.93 | 8.64 | 7.67 |
| 8 | | | 0.6 | 72 | 18,000 | 14,500 | 800 | 120 | 80 | 26 |
| | | | | | 9.86 | 9.23 | 9.04 | 8.63 | 8.27 | 7.44 |
| 9 | | | 0.8 | 72 | 18,000 | 4,500 | 300 | 90 | 60 | 24 |
| | | | | | 9.79 | 9.07 | 8.79 | 8.37 | 8.00 | 7.34 |
| 10 | (Blank) | | | 72 | 39,000 | 34,000 | 20,000 | 18,000 | 24,000 | 33,000 |
| | | | | | 10.18 | 10.15 | 10.07 | 10.13 | 10.08 | 10.06 |

TABLE 3

| RUN | 2-ethoxy ethyl acetate | ethyl aceto acetate | triethyl citrate | TEMP °F. | Viscosity and pH after time indicated. | | | | | | | | |
|---|---|---|---|---|---|---|---|---|---|---|---|---|---|
| | | | | | 0 hr/pH | 1 hr/pH | 2 hr/pH | 4 hr/pH | 6 hr/pH | 24 hr/pH | 30 hr/pH | 48 hr/pH | 74 hr/pH |
| 1 | 0.4 | | | 72 | 68,000 | 64,000 | 44,000 | 88,000 | 42,000 | 10,500 | 10,000 | 3,020 | 28 |
| | | | | | 10.23 | 9.89 | 9.77 | 9.49 | 9.25 | 8.29 | 8.08 | 7.96 | 7.04 |
| 2 | 0.6 | | | 72 | 104,000 | 80,000 | 88,000 | 30,000 | 28,000 | 14,500 | 10,500 | 4,040 | 32 |
| | | | | | 10.21 | 9.77 | 9.63 | 9.33 | 9.06 | 8.00 | 7.88 | 7.76 | 7.08 |
| 3 | 0.8 | | | 72 | 72,000 | 56,000 | 28,000 | 78,000 | 38,000 | 6,500 | 3,500 | 115 | 32 |
| | | | | | 10.20 | 9.76 | 9.61 | 9.24 | 8.89 | 7.89 | 7.79 | 7.42 | 7.06 |
| 4 | | 0.4 | | 72 | 44,000 | 64,000 | 72,000 | 48,000 | 36,000 | 5,500 | 2,800 | 120 | 30 |
| | | | | | 9.85 | 9.57 | 9.44 | 9.02 | 8.79 | 7.73 | 7.62 | 7.74 | 7.41 |
| 5 | | 0.6 | | 72 | 56,000 | 68,000 | 56,000 | 44,000 | 34,000 | 7,000 | 2,000 | 56 | |
| | | | | | 9.75 | 9.33 | 9.27 | 8.90 | 8.55 | 7.55 | 7.55 | 7.43 | |
| 6 | | 0.8 | | 72 | 40,000 | 44,000 | 28,000 | 38,000 | 26,000 | 1,000 | 50 | 20 | |
| | | | | | 9.66 | 9.26 | 9.12 | 8.63 | 8.24 | 7.41 | 7.37 | 7.34 | |
| 7 | | | 0.4 | 72 | 88,000 | 64,000 | 44,000 | 40,000 | 25,000 | 2,600 | 1,100 | 32 | |
| | | | | | 10.01 | 9.23 | 8.96 | 8.54 | 8.22 | 7.50 | 7.43 | 7.12 | |
| | | | M.W. | | | | | | | | | | |
| 8 | | | 0.6 | 72 | 68,000 | 64,000 | 44,000 | 26,000 | 20,000 | 1,600 | 550 | 30 | |
| | | | | | 9.97 | 8.93 | 8.62 | 8.11 | 7.93 | 7.29 | 7.30 | 7.01 | |
| 9 | | | 0.8 | 72 | 80,000 | 60,000 | 40,000 | 22,000 | 15,000 | 500 | 50 | 24 | |
| | | | | | 9.90 | 8.70 | 8.40 | 7.94 | 7.79 | 7.25 | 7.25 | 7.09 | |
| 10 | (Blank) | | | 72 | 130 | 80 | 50 | 30 | 9 | | | | |
| | | | | | 7.61 | 7.47 | 7.33 | 7.28 | 7.27 | | | | |

An invention has been provided with several advantages. The fracturing fluid of the invention cleans up faster and yields higher sand pack permeability than prior art systems. In addition, the fracturing fluid and method of the invention provide a method for producing a controlled reduction in the viscosity of the fracturing fluid with time so that the gelled fluid "breaks" at the conclusion of pumping operations, thereby facilitating the cleanup of the fluid from the formation. The method of the invention thus provides a controlled break while providing optimum initial gel stability.

While the invention has been shown in only one of its forms, it is not thus limited but is susceptible to various changes and modifications without departing from the spirit thereof.

I claim:

1. A method of fracturing a subterranean formation comprising the steps of:
   formulating a gellable fracturing fluid by blending together an aqueous fluid, a hydratable polymer, a suitable crosslinking agent for crosslinking the hydratable polymer to form a polymer gel, and an enzyme breaker;
   raising the pH of the fracturing fluid above about 9.0 to 10.5 whereby the enzyme breaker is inert;
   incorporating within the fracturing fluid a pH regulating substance which slowly hydrolyzes to produce a Bronsted acid, thereby dropping the pH of the fracturing fluid and activating the enzyme breaker with time to produce a controlled break of the polymer gel, the breaker being effective to degrade the polymer gel at temperatures below about 140-150 degrees F. within a time period less than about 24 hours.

2. The method of claim 1, wherein the hydratable polymer is selected from the group consisting of guars and derivitized guars, locust bean gum, karaya gum, carboxymethyl cellulose, carboxymethylhydroxyethyl cellulose, hydroxyethyl cellulose, polyvinyl alcohol and mixtures thereof.

3. The method of claim 1, wherein the crosslinking agent is selected from the group consisting of alkali metal borates, alkaline earth metal borates, boric acid and mixtures thereof.

4. The method of claim 1, wherein the crosslinking agent is a compound capable of providing metal ions selected from the group consisting of aluminum (III), boron(III), antimony(III), antimony(V), titanium(II), titanium(IV), chromium(VI), chromium(III), iron(II), iron(III), nickel(II), niobium(V), manganese(VII), arsenic(III), arsenic(V), tantalum(V), tin(II), lead(II) and zirconium(IV).

5. The method of claim 1, wherein the pH regulating substance is selected from the group consisting of organic anhydrides, acyl halides, sulfonyl halides, benzylic halides and low molecular weight esters.

6. The method of claim 5, wherein the pH regulating substance is a low molecular weight ester selected from the group consisting of ethyl acetate, 2-ethoxyethylacetate, ethylacetoacetate, triethylcitrate, methylbenzoate and dimethylphthalate.

7. A method of fracturing a subterranean formation comprising the steps of:

formulating a gellable fracturing fluid by blending together an aqueous fluid, a hydratable polysaccharide polymer capable of gelling in the presence of borate ions, a suitable crosslinking agent capable of furnishing borate ions in solution for crosslinking the hydratable polysaccharide polymer to form a polymer gel, and an enzyme breaker;

raising the pH of the fracturing fluid above about 9.0 to 10.5 whereby the enzyme breaker is inert;

incorporating within the fracturing fluid a pH regulating substance comprising a low molecular weight ester which slowly hydrolyzes to produce a Bronsted acid in situ, thereby dropping the pH of the fracturing fluid and activating the enzyme breaker with time to produce a controlled break of the polymer gel, the breaker being effective to degrade the polymer gel at temperatures below about 140–150 degrees F. within a time period less than about 24 hours.

8. The method of claim 7, wherein the pH regulating substance is a low molecular weight ester selected from the group consisting of ethyl acetate, 2-ethoxyethylacetate, ethylacetoacetate, triethylcitrate, methylbenzoate and dimethylphthalate.

9. The method of claim 8, wherein the hydratable polymer is selected from the group consisting of guar, hydroxypropyl guar and carboxymethyl hydroxypropyl guar.

* * * * *